March 22, 1966 S. A. HATCH ETAL 3,241,843
COMBINED RING AND FRUSTO-CONICAL MEMBER SEAL ASSEMBLY
Filed Nov. 29, 1961 3 Sheets-Sheet 1

Inventors:
Seymour A. Hatch,
James P. Morley,
Richard W. Blair,
By Cromwell, Greist & Warden
Attys March 22, 1966     S. A. HATCH ETAL     3,241,843
COMBINED RING AND FRUSTO-CONICAL MEMBER SEAL ASSEMBLY
Filed Nov. 29, 1961     3 Sheets-Sheet 2

Inventors:
Seymour A. Hatch,
James P. Morley,
Richard W. Blair,
By Cromwell, Greist & Warden
Attys.

March 22, 1966 S. A. HATCH ETAL 3,241,843
COMBINED RING AND FRUSTO-CONICAL MEMBER SEAL ASSEMBLY
Filed Nov. 29, 1961 3 Sheets-Sheet 3

Inventors:
Seymour A. Hatch,
James P. Morley,
Richard W. Blair,
By Cromwell, Greist & Warden
Attys

United States Patent Office 3,241,843
Patented Mar. 22, 1966

3,241,843
COMBINED RING AND FRUSTO-CONICAL
MEMBER SEAL ASSEMBLY
Seymour A. Hatch, Forest Park, James P. Morley, Chicago, and Richard W. Blair, Arlington Heights, Ill., assignors to Chicago Rawhide Manufacturing Company, Chicago, Ill., a corporation of Illinois
Filed Nov. 29, 1961, Ser. No. 155,640
10 Claims. (Cl. 277—92)

The invention is directed to a new and improved seal assembly of the general rotary end face type, the invention also being directed to a new and improved installation in which the seal assembly is mounted in a unique operational manner.

There are many known uses for rotary end face seals. Such uses include track roller installations in endless tread tractor units. This particular type of installation is representative of rather extreme requirements for end face seal operational life and efficiency. The seal not only must retain the lubricant but must also continue to function efficiently in the presence of foreign matter such as dirt and the like as well as under extreme weather conditions. Basic rotary end face seal designs have included a sealing ring engaged with a mating ring or mating surface, the sealing ring being provided with spring means acting in an axial direction and maintaining the sealing ring in end face running engagement with the mating surface, axially adjustable sealing ring interlocking means to transmit driving torque to the sealing ring, and secondary sealing means protecting the spring and interlock arrangement from dirt and the like to maintain efficient functioning thereof. Seals of this design are rather complicated, difficult to install, difficult to maintain, expensive, and often unreliable due to the design and operational complexities involved.

Efforts have been made to improve rotary end face seal operation and design. To a certain extent, these efforts have been directed toward the reduction in the total number of parts necessary in end face seal operation. Sealing and mating rings of special configuration have been combined with specially designed secondary sealing members which are intended to provide requisite end face sealing pressure, sealing ring driving torque, and secondary sealing between the ring and a part of the housing or shaft of the installation. The designs resulting from these efforts still leave much to be desired with regard to operational efficiency, economy in fabrication, and ease of installation. In this respect it has been found exceedingly difficult to combine in a single secondary member the various properties necessary to provide the three main and entirely different functions originally performed by three different elements.

It is an object of the present invention to provide a new and improved end face seal assembly and installation including the same, the assembly basically comprising a sealing ring and secondary sealing member which cooperate in a new and improved manner to provide long trouble free and efficient operation while permitting economies in fabrication and installation.

Another object is to provide a new and improved rotary seal formed from a sealing ring and a uniquely designed and positioned secondary compressible sealing member, the secondary member being of such design and arrangement to provide improvements in seal operation, this secondary member not only being capable of supplying the three essential functions of sealing pressure, seal operational torque, and efficient secondary sealing, but also improving certain aspects and characteristics of these functions.

Still another object is to provide a new and improved seal assembly including as basic parts thereof a sealing ring and mating member and means engaging the sealing ring to hold the same in sealing engagement with the mating member, the assembly being improved by the provision of closure means cooperating with the sealing ring and mating member to maintain assembly thereof prior to and during operational installation of the assembly.

Other objects not specifically set forth will become apparent from the following detailed description of the invention made ino conjunction with the accompanying drawings wherein.

Basically, the seal assembly of the present invention comprises a sealing ring engaged by a frusto-conical secondary sealing member which is formed from distortably compressible rubber or rubber-like material. The secondary sealing member is designed and is arranged to engage the sealing ring in the installed condition of the assembly and to apply to the sealing ring radial and axial force components, which radial force component may be of substantial magnitude within a wide range to meet greatly variable driving torque and secondary seal requirements. In the installed condition, the secondary sealing member is compressed in an axial direction. Depending on the rotational speed in a given installation and the type and pressure of the media being sealed, the axial force component defining the sealing face contact pressure of the sealing ring may range from about 5 p.s.i.

to 150 p.s.i. Throughout this range of axial force component, the cooperating radial force component will preferably be at least as great as the axial force component and can be at least as much as 3 times as great even under face loading conditions of 150 p.s.i. This unusually wide range of operational force conditions is due to the particular design and unique structural arrangement of the seal assembly of this invention. In bringing this about, the installed angle of the secondary sealing member will preferably be within the range from about 40° to 90° relative to the center axis of the sealing ring. In general, the secondary sealing member is designed and arranged to be compressed to an extent and into a position relative to the sealing ring whereby an adequate axial force component is applied to the sealing ring for efficient sealing engagement with a mating surface and a sufficient or even very substantially greater radial force component can be applied to the sealing ring for efficient torque transmission thereto through the secondary sealing member. Additionally, there is controlled positioning of the sealing ring during extended operational use thereof, sufficient axial movement of the sealing ring as is required to maintain efficient running engagement with a mating surface is still available, and an efficient secondary seal between the sealing ring and a part of the installation is maintained.

Figure 1:
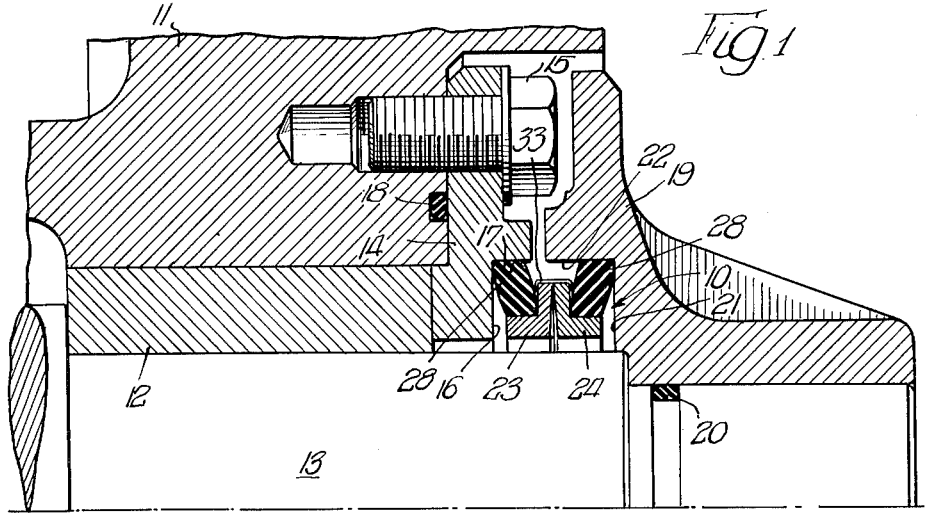
FIG. 1 is a fragmentary half section of a track roller installation illustrating one form of the new and improved seal assembly of the invention in installed operative position.
Figure 2:
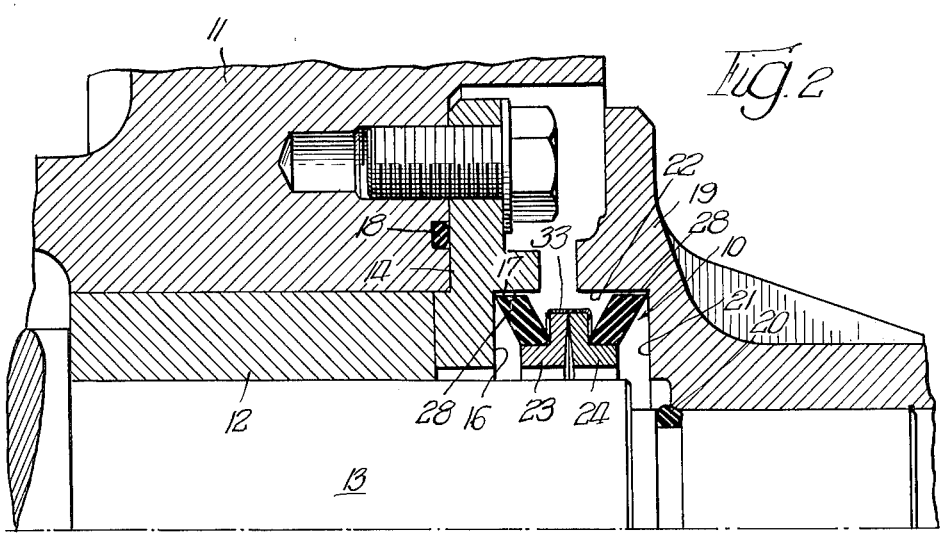
FIG. 2 is a view similar to FIG. 1 illustrating the installation just prior to completed assembly thereof.

FIGS. 1 and 2 illustrate a typical track roller installation including one form of the seal assembly of the present invention, this particular form being identified by the numeral 10. The installation includes a track roller 11 mounted on a main bearing 12 for rotation about a shaft 13. A thrust plate 14 is fixed to the roller 11 by a plurality of fasteners 15 and engages the outer end of the main bearing 12. The thrust plate 14 is formed with an outer surface annular recess defined by a radial surface 16 and an axial surface 17 which are joined at right angles. A suitable O-ring unit 18 forms a seal between the thrust plate and track roller 11. The outer end of the roller shaft 13 has mounted thereon a track shaft cap 19 which is suitably fixed on the shaft 13 and which is axially movable outwardly therealong for seal assembly installation. The cap 19 includes suitable fastener means (not shown) to fix the same on the shaft 13. An O-ring sealing unit 20 is located between the outer reduced end of the shaft 13 and the cap 19. This cap includes an inwardly opening annular recess portion defined by a radial wall surface 21 joined with an axial wall surface 22 in right angle relation. The seal assembly 10 is mounted about the shaft 13 in spaced relation therewith and is engaged between the thrust plate 14 and cap 19.

Figure 3:
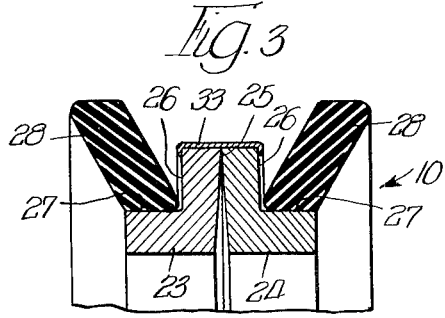
FIG. 3 is an enlarged fragmentary section of the seal assembly used in FIGS. 1 and 2.
Figure 4:
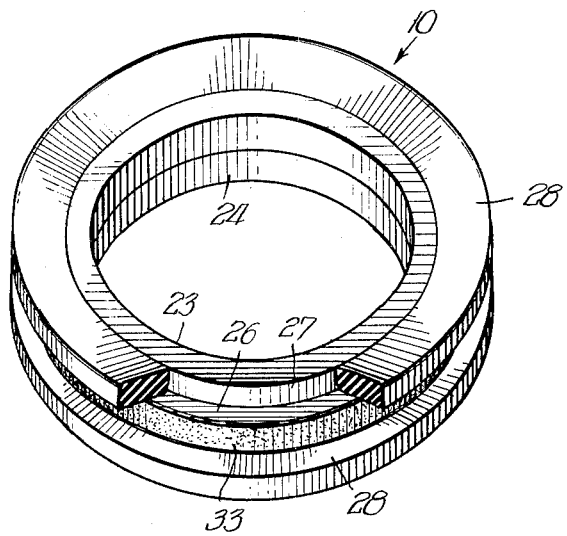
FIG. 4 is a fragmentary perspective of the seal assembly.

FIGS. 3 and 4 best illustrate the seal assembly 10. This assembly comprises a pair of cooperating rings 23 and 24 having inner diameters greater than the diameter of the shaft 13. The rings 23 and 24 are of the same design and each may be considered a sealing ring or one may be considered the sealing ring and the other the mating ring or member. The rings 23 and 24 each include an end face annular sealing surface 25 which as illustrated is located adjacent the outer peripheral edge of the radially directed segment of each ring. These rings are of generally L-shape and each ring is formed with a right angled outwardly facing recess defined by a radial wall surface 26 and an axial wall surface 27. As shown in FIGS. 1 and 2, the sealing ring surfaces 26 and 27 are arranged relative to the cooperating thrust plate surfaces 16 and 17 and cap surfaces 21 and 22 to geometrically define therewith a generally rectangular secondary seal area.

Figure 5:
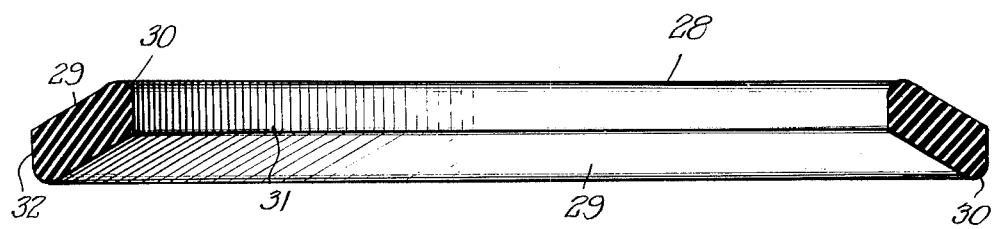
FIG. 5 is a fragmentary section of one of the secondary sealing members of the assembly.

The secondary seal for each of the sealing rings 23 and 24 is provided by an elastomer 28 of generally frusto-conical shape and formed from rubber or rubber-like material which is compressible. FIG. 5 illustrates a preferred form of elastomer 28 which is provided with parallel inclined side surfaces 29 each terminating in a radius 30 at one end thereof and at the opposite end thereof terminating in generally right angled shape by juncture with flat end surface portions 31 and 32. The geometry of the combined surfaces of the member 28 is such that the member is reversible in that it can be mounted on either of the sealing rings 23 and 24. With regard to the specific assembly 10, the flat end surface portion 31 defines the outer diameter of the member 28 and the opposite flat end surface portion 32 defines the inner diameter, this surface portion being mounted against the axial surface 27 of a ring. The convex corners 30 are adapted to be received at the juncture of the right angled surfaces 26 and 27 of a sealing ring, 16 and 17 of the thrust plate 14, and 21 and 22 of the cap 19.

Referring particularly to FIGS. 3 and 4, the sealing rings 23 and 24 are held in end face engagement prior to and during installation by a circumferentially arranged strip-like closure means 33 overlying the peripheral mating edges of the sealing surfaces 25 and extending inwardly in overlapping relation along the radial surfaces 26. The closure strip 33 holds the sealing rings in assembled relation, the secondary sealing member 28 being retained on the sealing rings by reason of frictional engagement with the axial surfaces 27. The closure strip 33 may be formed from a cellulose band of a type which is well known and sometimes used in establishing a breakable seal between a closure cap and a bottle. The cellulose band is maintained in a suitable solution which causes the cellulosic material to swell, is applied in wet form in overlying relation circumferentially about the rings 23 and 24, and upon drying shrinks into tight engagement therewith. The band exhibits sufficient strength to hold the rings in assembled condition prior to and during installation to form a complete cartridge-type package for handling, shipping, installation, etc. This band greatly aids in the installation of the complete seal assembly and need not be removed from the assembly following installation thereof. Upon operation of the track roller installation of FIG. 1, the torque transmitted to the sealing ring 23 by the track roller 11 will be sufficient to break the band 33, the material of this band ultimately being disintegrated in the installation without causing any operational difficulties. Any material capable of providing the functions described may be used in forming the closure band 33. Furthermore, this particular aspect of the invention is not limited to use solely with the new and improved types of seal assemblies disclosed therein.

FIG. 2 illustrates positioning of the seal assembly 10 in the track roller unit just prior to complete closing thereof and final positioning of the cap 19. It will be noted that in this condition the seal assembly 10 retains its initial configuration as shown in FIGS. 3 and 4. However, the secondary sealing members 28 are designed so that upon complete closing and final positioning of the cap 19 they become compressively distorted axially toward one another and radially inwardly to a rather substantial degree as illustrated in FIG. 1. Compression to a substantial extent constitutes an important aspect of efficient utilization of the seal assembly of the present invention. The final angularity of the installed secondary sealing members 28 is changed to an extent that radial and axial force components of sufficient relative magnitude are applied against the sealing rings 23 and 24 as well as against the right angled mounting surfaces engaged with the outer diameters of the members 28. The distortion of the secondary sealing members 28 from their free position to their installed position creates shear and compression forces to supply efficient seal face loading and supply a relatively high contact force for secondary sealing and torque transmission to the sealing ring. By referring to the secondary sealing member being compressed in an axial direction, it is intended to cover the actual distortion which the secondary sealing member undergoes upon completed installation bearing in mind that technically rubber is not compressible. Such distortion involves the application of a load in an axial direction resulting in a substantial foreshortening or deformation of the secondary sealing member accompanied by radial growth to wedge the secondary sealing member in radially resiliently acting position between the sealing ring and a part of the housing. In this position the secondary sealing member is in shear and compression, the shear condition being primarily responsible for the axial force component developed and the compression condition being primarily responsible for the radial force component developed. It has been found that the forces establishing the secondary seal and torque transmission may be greatly increased by reason of the design of the seal assembly of the present invention while maintaining sealing face loading within an efficiently usable range. Among other advantages, this discovery results in a great simplification of end face seal design and eliminates the use of auxiliary mechanical interlocks as well as secondary seal elements, such as relatively weak or fragile flexible diaphragms, while maintaining efficient, end face sealing thrust. An important aspect of the improvement resides in the utilization of a compressible secondary seal which upon installation is placed in shear as well as compression to provide the new and improved results.

By use of the general frusto-conical shape in forming a compressible secondary sealing member of the type described, it is possible to position one diameter of the secondary member statically on the sealing ring and the other diameter statically on the cooperating part of the installation. This design permits conversion of compressive strains and forces established in the secondary member itself into effectively directed or applied forces at the mating surfaces of the sealing rings, which forces are at least the full equivalent of spring rates in seals normally equipped with auxiliary face loading springs. This unusual conversion of compressive strains and forces may be used to provide the secondary sealing member with a considerably greater static sealing force than the face loading force also supplied thereby wherever desired. In other words, this conversion may be used to maximize the frictional forces existing at the static sealing faces so that a considerable torque may be transmitted by the secondary member. It will be appreciated that variations in axial and radial forces are available in a given installation by mere control of secondary sealing member compressive positioning upon installation thus eliminating the existing practice of substituting springs of different ratings.

It has been found that the installed angularity (angle obtained upon installational compression) should come within the range of from about 40° to 90° relative to the center axis of the sealing ring or installation. With the design described, tests have shown that the radial component of force transmitted to the sealing ring by the secondary member may be controlled to be on the order of as much as 3 times the axial or end face seal loading component of force supplied by the secondary member. This range in force ratio is highly desirable with regard to supplying adequate torque to the sealing member and for the purpose of maintaining efficiently operating static seals at the end surfaces of the secondary member under widely varying operational conditions including high face loading conditions. Within the range of angularity specified, it has been found that any desired ratio of radial and axial force components may be adequately maintained. In this respect, the ratios of radial force component to axial force component may range from 1 to 1 to 3 to 1 over a range of sealing face loading of about 5 p.s.i. to 150 p.s.i.

The seal assembly 10 has been subjected to severe operational tests with surprising results. The right angled surfaces engaged by the secondary sealing members 28 to define static seals were polished smooth and supplied with a coating of grease. Slippage was noted only after the sealing ring surfaces were substantially overloaded and the starting torque applied was so great as to exceed expected operational conditions. Nevertheless, no leakage occurred and the seal continued to perform satisfactorily without being dismantled. As a result of tests it has been found that the secondary sealing members 28 are capable of breaking loose sealing rings which are frozen to mating surfaces at temperatures as low as minus 63° F. without attendant slippage.

FIGS. 6–11 illustrate different forms of seal assemblies and components utilizing the principles of the present invention. The modifications are illustrated in their free condition bearing in mind that upon completed installational mounting the secondary sealing members will become compressed in the manner described above. Furthermore, it will be understood that the specific modifications illustrated are not intended to be limiting but are merely illustrative of various environmental uses of some of the concepts of the invention.

Figure 6:
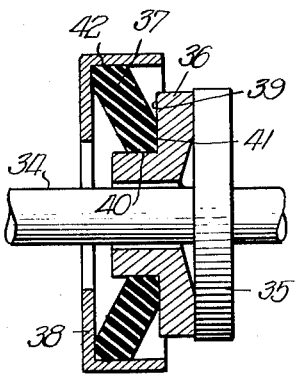
FIG. 6 is a fragmentary section of a modified end face seal incorporating the improved design features of the invention.

FIG. 6 illustrates an installation including a shaft 34 having fixedly mounted thereon an annular mating plate 35 against which a sealing ring 36 is placed in end face sealing engagement by a frusto-conical secondary sealing member 37 extending between the same and a mounting part 38. The rear surface of the sealing ring 36 is formed with a radial surface portion 39 joined at right angles with an axial surface portion 40. The mounting part 38 is of right angle configuration and may constitute a cover plate or the like in a particular installation. The secondary sealing member 37 is formed from compressible elastomeric material and the inner and outer end surfaces 41 and 42 may be of general V-shape for seating at the juncture of the right angle confining surfaces of the sealing ring 36 and mounting part 38. The secondary sealing member 37 functions in the manner described above to maintain the sealing ring 36 in end face sealing engagement with a mating surface of the member 35.

Figure 7:
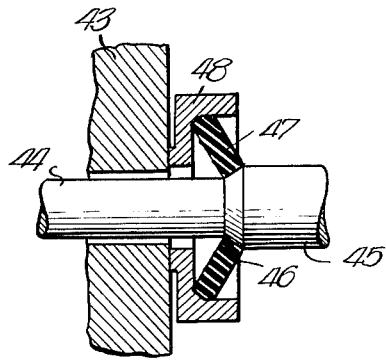
FIG. 7 is a fragmentary section of still another modification of the seal.

FIG. 7 illustrates an installation involving a fixed part 43 receiving through a bore therein a shaft 44. This shaft is formed with an enlarged portion 45 defining an angled secondary sealing member mounting surface 46. A frusto-conical secondary sealing member 47 of the type described is mounted between the shoulder 46 and cooperating surface portions of a sealing ring 48 which is in running end face sealing engagement with the outer surface of the fixed part 43. The cooperating mounting surfaces of the sealing ring 48 which are engaged by the secondary sealing member 47 are not of true right angle configuration but are arranged to adequately fix and hold the outer end of the secondary sealing member 47 in efficiently functioning position. The shoulder 46 of the shaft portion 45 seats the inner end surface of the secondary sealing member 47 for compression thereof in an axial direction to establish and maintain the force components required for operation of the seal. The arrangement illustrated in FIG. 7 is somewhat more complicated due to the use of another type of generated surface 46 which is not a right angle surface of the type previously described. FIG. 7 is illustrative of the advantages of the use of all right angle surfaces as such use does not require the generation of separate multiple or difficult surfaces. Thus another important aspect of the invention resides in the fact that the particular type of secondary sealing member used is especially adapted for mounting against plane and cylindrical surfaces and does not require conical, tapered, inclined, or other specially generated surfaces for efficient operation thereof.

Figure 8:
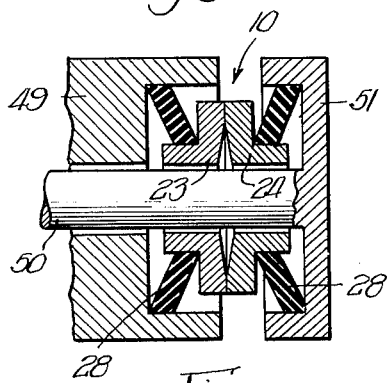
FIG. 8 is a fragmentary section of another type of installation in which the seal of the invention is adapted for use.

FIG. 8 illustrates use of the assembly 10 previously described in a different type of installation. This installation makes use of a part 49 receiving therethrough a shaft 50, the shaft being formed at the end thereof with an integral annular member 51. The member 51 on the inner surface thereof is provided with right angled secondary sealing member mounting surfaces opposed to similar right angled mounting surfaces formed in the outer end of the fixed part 49. Thus, the seal assembly 10 is adapted for mounting in many different types of installations, such installations requiring only slight inexpensive pre-working to accommodate the seal assembly.

The secondary sealing members need not be bonded to the sealing ring or other mounting part in order to perform the improved functions. However, bonding may be relied upon depending upon the particular design needed for a given installation.

Figure 9:
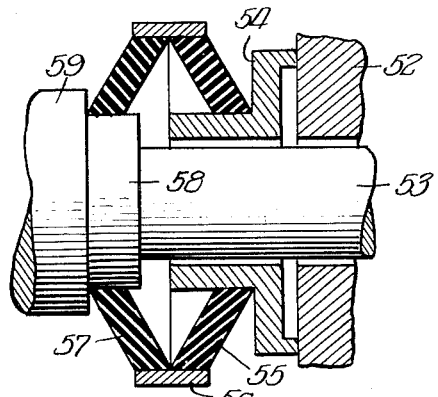
FIG. 9 is a fragmentary section of another form of the seal illustrating use of a modified secondary sealing member.

FIG. 9 illustrates another type of installation including a part 52 receiving therethrough a shaft 53 about which is mounted a sealing ring 54 in end face sealing engagement with the part 52. The rear face of the sealing ring 54 is formed with right angled surfaces and has engaged herewith a frusto-conical secondary sealing member 55 extending rearwardly and outwardly into outer end face bonded attachment with an annular part 56. This part may be rotatable or fixed depending upon the intended use of the installation. The part 56 has also bonded thereto the outer end surface of another frusto-conical secondary sealing member 57 which extends into engagement with a first shoulder portion 58 of the shaft 53 cooperatively arranged with a second enlarged shoulder portion 59 on the shaft 53. The shoulder portions 58 and 59 cooperatively provide a right angled mounting area for the inner end of the secondary sealing member 57.

Figure 10:
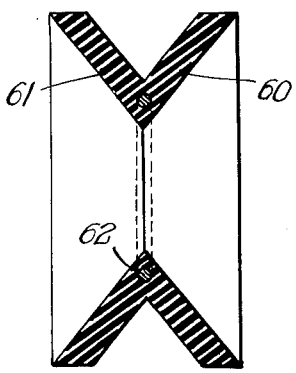
FIG. 10 is a sectional view of another form of the basic secondary sealing member of the invention.

FIG. 10 illustrates a modified form of secondary sealing member unit including a generally V arrangement of joined secondary sealing member leg portions 60 and 61. The inner diameter portion of the unit includes an annular metallic ring 62 embedded in the base of the unit to provide adequate strength thereto for utilization of the unit in the same manner as the secondary sealing member unit of FIG. 9.

Figure 11:
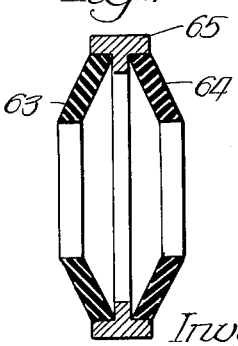
FIG. 11 is a sectional view of still another modified form of secondary sealing member.

FIG. 11 illustrates a unit of somewhat similar design including a pair of frusto-conical secondary sealing members 63 and 64 having their outer end surfaces engaged with right angled surface portions of an annular member 65 which is generally in the form of a T. The unit of FIG. 11 does not require bonding of the outer end surfaces of the secondary sealing members 63 and 64 to the annular member 65. The use of multiple secondary sealing members in the manner shown in FIGS. 9–11 is indicative of a "stacking" advantage. Where a very high radial force is required, a pair of secondary sealing members may be used as shown and yet still permit requisite axial "play" or movement of the sealing ring as a result of wear during extended operational use.

While the secondary sealing members illustrated and described herein are termed as "frusto-conical," it will be understood that the invention is of a scope sufficient to include the use of secondary sealing members of shapes other than true "frusto-conical" shape. As long as a secondary sealing member is shaped to permit adequate axial and radial compression thereof in the manner and to the extent described to provide the requisite functions, such a secondary sealing member comes within the scope of this invention.

Obviously certain modifications and variations of the invention as hereinbefore set forth may be made without departing from the spirit and scope thereof, and therefore only such limitations should be imposed as are indicated in the appended claims.

We claim:

1. An end face seal assembly for installation in a shaft assembly, said seal assembly consisting of a sealing ring having a radial outer end face sealing surface for positioning freely about a shaft, a periphery of said sealing ring axially rearwardly of said sealing surface defining divergent generally axially and radially directed surface portions presenting circumferential continuity, said surface portions defining therebetween a rearwardly opening seat for readily accessible force loading of said sealing ring, and a secondary sealing and driving member formed solely from distortively resilient solid rubber material and in the form of a ring provided with an effective frusto-conical shape removably and solely frictionally and slidably mounted in said seat, the cross-sectional configuration of said secondary sealing member further generally conforming to a parallelogram having radially inclined side surface portions and an end surface portion extending in an axial direction and being in rearwardly unconfined removable frictional and slidable engagement with the axially directed surface portion of said sealing ring seat, said secondary sealing member extending rearwardly from said sealing ring in inclined relation thereto with a leading edge of said end surface portion in abutting but radially unconfined engagement with the radially directed surface portion of said sealing ring seat, said secondary sealing member being adapted for similar axial and radial engagement by the other end surface portion thereof with a part of said shaft assembly spaced radially and rearwardly from said divergent surface portions of said sealing ring for unrestricted axial and radial distortive resilient spring action of said secondary sealing member upon operative mounting of said seal assembly in said shaft assembly, whereby said secondary sealing member is distortively compressed throughout the entire cross section thereof to supply a face loading force to said sealing ring and simultaneously frictionally interlock said sealing ring, secondary sealing member and shaft assembly part, the axially directed surface portion of said sealing ring seat being at least coextensive with said first named end surface portion of said secondary sealing member for unrestricted transmission of loading force to said sealing ring upon operative mounting of said seal assembly.

2. An end face seal assembly for installation in a shaft assembly, said seal assembly comprising a pair of sealing rings each having a radial outer end face sealing surface for positioning freely about a shaft in mutual end face surface sealing engagement, a periphery of each of said sealing rings axially rearwardly of said sealing surface defining divergent generally axially and radially directed surface portions presenting circumferential continuity, said surface portions defining therebetween a rearwardly opening seat for readily accessible force loading of said sealing rings, and a pair of secondary sealing and driving members formed solely from distortively resilient solid rubber material and each in the form of a ring provided with an effective frusto-conical shape removably and solely frictionally and slidably mounted in said seats, the cross-sectional configuration of each of said secondary sealing members further generally conforming to a parallelogram having radially inclined side surface portions and an end surface portion extending in an axial direction and being in rearwardly unconfined removable frictional and slidable engagement with the axially directed surface portion of a sealing ring seat, said secondary sealing members extending rearwardly from said sealing rings in inclined relation thereto with a leading edge of each of said end surface portions in abutting but radially unconfined engagement with the radially directed surface portion of a sealing ring seat, said secondary sealing members being adapted for similar axial and radial engagement by the other end surface portions thereof with parts of said shaft assembly spaced radially and rearwardly from said divergent surface portions of each of said sealing rings for unrestricted axial and radial distortive resilient spring action of said secondary sealing members upon operative mounting of said seal assembly in said shaft assembly, whereby said secondary sealing members are distortively compressed throughout the entire cross sections thereof to supply a face loading force to each of said sealing rings and simultaneously frictionally interlock said sealing rings, secondary sealing members and shaft assembly parts, the axially directed surface portions of said sealing ring seats being at least coextensive with said first named end surface portions of said secondary sealing members for unrestricted transmission of loading force to said sealing rings upon operative mounting of said seal assembly.

3. The seal assembly of claim 2 wherein said sealing rings are held in end face sealing surface engagement by pressure and heat disintegratable means applied to adjacent surfaces of said sealing rings on said sealing rings to hold said sealing rings in assembled engagement with said secondary sealing members frictionally mounted in the seats of said sealing rings prior to and initially during installation of said seal assembly in a shaft assembly.

4. The seal assembly of claim 2 wherein said sealing rings are held in end face sealing surface engagement by strip-like closure means overlying the outer periphery of said sealing rings in overlapping engagement therewith to hold said sealing rings in assembled engagement with said secondary sealing members frictionally mounted in the seats of said sealing rings prior to and initially during installation of said seal assembly in a shaft assembly, said strip-like closure means being formed from material which disintegrates upon operational use of said seal assembly.

5. In a shaft installation, the provision of an end face seal assembly comprising a sealing ring having a radial outer end face sealing surface in sealing engagement with a mating surface forming a part of said installation, a periphery of said sealing ring axially rearwardly of said sealing surface defining divergent generally axially and radially directed surface portions presenting circumferential continuity, said surface portions defining therebetween a rearwardly opening seat for readily accessible force loading of said sealing ring, and a secondary sealing and driving member formed solely from distortively resilient solid rubber material in the form of a ring provided with an effective frusto-conical shape removably and solely frictionally and initially slidably mounted in said seat, the cross-sectional configuration of said secondary sealing member further generally conforming to a parallelogram having radially inclined side surface portions and an end surface portion extending in an axial direction and being in rearwardly unconfined removable frictional and initially slidable engagement with the axially directed surface portion of said sealing ring seat, said secondary sealing member extending rearwardly from said sealing ring in inclined relation thereto with a leading edge of said end surface portion in abutting but radially unconfined engagement with the radially directed surface portion of said sealing ring seat, said secondary sealing member being in similar axial and radial engagement by the other end surface portion thereof with a part of said shaft installation spaced radially and rearwardly from said divergent surface portions of said sealing ring seat and in cooperation with said divergent surface portions placing said secondary sealing member in unrestricted axially and radially distortively compressed condition throughout the entire cross section thereof between said part and said sealing ring, whereby an unrestricted dynamic spring action is established using the entirety of said secondary sealing member to supply a face loading force to said sealing ring and simultaneously frictionally interlock said sealing ring, secondary sealing member and shaft installation part, the axially directed surface portion of said sealing ring seat being at least coextensive with said first named end surface portion of said secondary sealing member for unrestricted transmission of loading force to said sealing ring, said secondary sealing member except for its engagement with said sealing ring and said part being otherwise unconfined within said shaft installation.

6. The seal assembly of claim 5 wherein said shaft installation part includes divergent generally axially and radially directed surface portions defining a seat which is equivalent to but opposed to the seat of said sealing ring, said seat of said part receiving said other end surface portion of said secondary sealing member in removable frictional and initially slidable engagement therewith.

7. The seal assembly of claim 5 wherein the dynamic spring action of said secondary sealing member establishes radial and axial force components applied to said sealing ring at a ratio of from about 1 to 1 to 3 to 1 throughout an axial force component range of from about 5 p.s.i. to 150 p.s.i.

8. In a shaft installation, the provision of an end face seal assembly comprising a pair of sealing rings each having a radial outer end face sealing surface received about a shaft and in mutual end face surface sealing engagement, a periphery of each of said sealing rings axially rearwardly of said sealing surface defining divergent generally axially and radially directed surface portions presenting circumferential continuity, said surface portions defining therebetween a rearwardly opening seat for readily accessible force loading of said sealing rings, and a pair of secondary sealing and driving members formed solely from distortively resilient solid rubber material and each in the form of a ring provided with an effective frusto-conical shape removably and solely frictionally and initially slidably mounted in said seats, the cross-sectional configuration of each of said secondary sealing members further generally conforming to a parallelogram having radially inclined side surface portions and an end surface portion extending in an axial direction and being in rearwardly unconfined removable frictional and initially slidable engagement with the axially directed surface portion of a sealing ring seat, said secondary sealing members extending rearwardly from said sealing rings in inclined relation thereto with a leading edge of each of said end surface portions in abutting but radially unconfined engagement with the radially directed surface portion of a sealing ring seat, said secondary sealing members being in similar axial and radial engagement by the other end surface portion thereof with parts of said shaft installation spaced radially and rearwardly from said divergent surface portions of each of said sealing ring seats with said secondary sealing members being unrestrictively axially and radially distortively compressed throughout the entire cross-sections thereof between said sealing rings and said parts, whereby a dynamic spring action is established using the entirety of said secondary sealing members to supply a face loading force to said sealing rings and simultaneously frictionally interlock said sealing rings, secondary sealing members and shaft installation parts, the axially directed surface portions of said sealing ring seats being at least coextensive with said first named end surface portions of said secondary sealing members for unrestricted transmission of loading force to said sealing rings, each of said secondary sealing members except for its engagement with a sealing ring and a part being otherwise unconfined in said shaft installation.

9. The seal assembly of claim 8 wherein said shaft installation parts each include divergent generally axially and radially directed surface portions defining a seat which is equivalent to but opposed to the seat of an adjacent sealing ring, said seat of each of said parts receiving said other end surface portion of a secondary sealing member in removable frictional and initially slidable engagement therewith.

10. The seal assembly of claim 8 wherein the dynamic spring action of said secondary sealing members establishes radial and axial force components applied to said sealing rings at a ratio of from about 1 to 1 to 3 to 1 throughout an axial force component range of from about 5 p.s.i. to 150 p.s.i.

(References on following page)

References Cited by the Examiner

UNITED STATES PATENTS

| | | | |
|---|---|---|---|
| 2,167,669 | 8/1939 | Molyneux | 277—92 |
| 2,214,243 | 9/1940 | Casson | 277—90 |
| 2,289,274 | 7/1942 | Krug | 277—42 |
| 2,871,039 | 1/1959 | Payne | 277—38 |
| 2,911,840 | 11/1959 | Muller et al. | 277—42 X |
| 3,073,657 | 1/1963 | Oxford. | |
| 3,110,097 | 11/1963 | Yocum | 277—9 X |
| 3,185,488 | 5/1965 | Christensen et al. | 277—42 |

FOREIGN PATENTS 1,255,283  1/1961  France.

LAVERNE D. GEIGER, *Primary Examiner.*

WALTER A. SCHEEL, EDWARD V. BENHAM, LEWIS J. LENNY, *Examiners.*